United States Patent
Jochman (10) Patent No.: US 10,815,862 B2
(45) Date of Patent: *Oct. 27, 2020

(54) POWER SYSTEMS AND ENCLOSURES HAVING IMPROVED COOLING AIR FLOW

(71) Applicant: Illinois Tool Works Inc., Glenview, IL (US)

(72) Inventor: Nathan Joe Jochman, Menasha, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/533,539

(22) Filed: Aug. 6, 2019

(65) Prior Publication Data

US 2020/0173337 A1 Jun. 4, 2020

Related U.S. Application Data

(63) Continuation of application No. 15/480,955, filed on Apr. 6, 2017, now Pat. No. 10,371,039.

(60) Provisional application No. 62/329,727, filed on Apr. 29, 2016.

(51) Int. Cl.
*F02B 63/04* (2006.01)
*H02K 7/18* (2006.01)
(Continued)

(52) U.S. Cl.
CPC ............... *F01P 1/06* (2013.01); *B23K 9/32* (2013.01); *F01N 13/007* (2013.01); *F01P 1/02* (2013.01);
(Continued)

(58) Field of Classification Search
CPC ....................................... F01P 1/02; F01P 1/06
See application file for complete search history.

(56) References Cited

U.S. PATENT DOCUMENTS

| | | |
|---|---|---|
| 9,474,185 B2 | 10/2016 | Jochman |
| 2006/0027547 A1 | 2/2006 | Silvestro |
| 2017/0034957 A1 | 2/2017 | Jochman |

FOREIGN PATENT DOCUMENTS

| | | |
|---|---|---|
| CN | 101312880 | 11/2008 |
| EP | 3124158 | 2/2017 |

(Continued)

OTHER PUBLICATIONS

Int'l Search Report and Written Opinion for Appln No. PCT/US2017/029655 dated Aug. 24, 2017 (15 pages).

(Continued)

*Primary Examiner* — Tulsidas C Patel
*Assistant Examiner* — Thomas K Quigley
(74) *Attorney, Agent, or Firm* — McAndrews, Held & Malloy, Ltd.

(57) ABSTRACT

Power systems and enclosures having improved cooling air flow are disclosed. An example power system includes an enclosure; an air inlet location at a first location on an exterior of the enclosure to permit intake of air from the exterior of the enclosure to an interior of the enclosure; an air exhaust location at a second location on the exterior of the enclosure to exhaust the air taken in through the air inlet location; and an air routing path defined by the enclosure to direct the air from the air inlet location to the air exhaust location, in order: through one or more first compartments in the enclosure, the one or more first compartments containing at least one of a compressor, a generator, or power conversion circuitry; and through one or more second compartments, the one or more second compartments comprising an engine and a muffler.

19 Claims, 11 Drawing Sheets

(51) Int. Cl.
| | |
|---|---|
| *F01P 1/06* | (2006.01) |
| *F01P 1/02* | (2006.01) |
| *F02B 67/06* | (2006.01) |
| *B23K 9/32* | (2006.01) |
| *F04C 18/16* | (2006.01) |
| *F04C 29/00* | (2006.01) |
| *H02K 7/10* | (2006.01) |
| *H02K 7/108* | (2006.01) |
| *F01N 13/00* | (2010.01) |
| *F02B 63/06* | (2006.01) |
| *F02M 35/10* | (2006.01) |
| *B23K 9/10* | (2006.01) |

(52) U.S. Cl.
CPC ............ *F02B 63/04* (2013.01); *F02B 63/044* (2013.01); *F02B 63/06* (2013.01); *F02B 67/06* (2013.01); *F02M 35/10268* (2013.01); *F04C 18/16* (2013.01); *F04C 29/005* (2013.01); *H02K 7/1004* (2013.01); *H02K 7/108* (2013.01); *H02K 7/1815* (2013.01); *B23K 9/1006* (2013.01); *F04C 2240/60* (2013.01)

(56) References Cited

FOREIGN PATENT DOCUMENTS

| | | |
|---|---|---|
| WO | 2008134182 | 11/2008 |
| WO | 2010050480 | 5/2010 |
| WO | 2012100635 | 8/2012 |
| WO | 2015048544 | 4/2015 |

OTHER PUBLICATIONS

International Bureau, "International Preliminary Report on Patentability," issued in connection with International Patent Application PCT/US2018/047469, dated Mar. 12, 2020, 8 pages.

POWER SYSTEMS AND ENCLOSURES HAVING IMPROVED COOLING AIR FLOW

RELATED APPLICATIONS

This patent claims priority to U.S. Provisional Patent Application No. 62/329,727, filed Apr. 29, 2016, entitled "Power Systems and Enclosures Having Improved Cooling Air Flow." The entirety of U.S. Provisional Patent Application No. 62/329,727 is incorporated herein by reference.

BACKGROUND

Conventionally, engine-driven power systems (e.g., generators/air compressors/welders) are contained within a metal enclosure that provides environmental protection for the equipment and provides a safety, sound, and aesthetic barrier for the operators. Many different types of enclosures have been used for conventional power systems. Conventional enclosures allow air to enter and exit the enclosure to cool the engine and/or generator components.

SUMMARY

Power systems and enclosures having improved air flow are disclosed, substantially as illustrated by and described in connection with at least one of the figures.

BRIEF DESCRIPTION OF THE DRAWINGS

The figures are not necessarily to scale. Where appropriate, similar or identical reference numbers are used to refer to similar or identical components.

DETAILED DESCRIPTION

Conventionally, doors are located on multiple sides of the equipment to provide access to all of the needed service points, and inlet and exhaust louvers are in multiple locations so as to let air in and out of the enclosure as needed for cooling. Examples of engine-driven products that have enclosures are home-standby generators, portable generators and/or welders, and portable air compressors. The enclosure is often well suited for the use of the equipment and has multiple access panels (e.g., doors) and/or air inlet and exit openings (louvers/holes).

Disclosed examples provide an improved cooling air flow through enclosures including engine-driven generators. In some examples, an improved construction and/or configuration of engine-driven generators in enclosures simplify machine design and have airflow paths that allow the unit to be placed in, operate in, and be serviced in typical truck mounted installations.

Disclosed examples improve cooling air flow by having one air inlet location for all cooling air located at one end of the enclosure, and one exit location for all exiting hot air at the top of the enclosure. Disclosed examples further include an air routing path through, in order, a front compressor/welder compartment in the enclosure, underneath the engine mounted in the enclosure, through the engine, and then exiting past a muffler out the top of the enclosure. The example air flow configuration allows the unit to be installed into truck and/or other tight applications with zero clearance on more than one side. Because there are no access or airflow inlets or exits present on multiple sides of disclosed example enclosures, and only one side has an airflow intake, the zero clearance can be achieved on the other sides.

Disclosed examples improve the cooling air flow by thermally aligning the multiple components needing cooling air so that one airflow path can cool multiple systems and components. Specifically the airflow path includes air entering through the front panel, then passing an air compressor oil cooler, then passing welding/battery charging components, then passing a generator and/or an engine, then passing a muffler, then exits the enclosure through the top cover above the engine and muffler. This alignment places the components that benefit from being cooled by the coolest air first in the airflow path (e.g., the air compressor cooler and the weld components). The engine and/or the generator, which can be cooled with pre-heated air, are cooled next. The engine muffler, which operates very hot and can be cooled with the hottest air, is placed last in the airflow path. This thermal alignment is achieved due to the placement of the air compressor cooler directly at the air inlet louvers and by having an airflow path underneath the engine to allow the engine to drive the generator and compressor located near the front of the enclosure and the engine fan at the back of the enclosure to pull in air to cool the engine. The engine and muffler are located in a hot side of the enclosure which is separated by baffling from the cold side of the enclosure. The cold side is the suction or inlet side of the engine fan and the hot side is the pressure or exit side. This separation defines the cooling paths and simplifies the product by allowing the engine fan to move all (or the majority) of the cooling air for all of these different systems thereby reducing the number or size of fans in the cooling circuit.

Disclosed examples provide single side service access for the components of the power systems. For example, a compressor and an engine require service access for oil replacement, filter replacement, and/or any other maintenance tasks. Disclosed examples include enclosures in which the service access points are all located on one side and/or through one or more movable top covers of the enclosure. The single side and/or top cover access allows the other sides of the unit to be placed with substantially zero clearance up against walls of an installation site (e.g., a work truck body and/or other objects). In some examples, the enclosure has air intake and/or air exhaust locations on the same and/or different sides of the enclosure, which provide additional restrictions on clearance. In some examples, at least three sides of the enclosure can be provided with substantially zero clearance in an installation of the power system.

In disclosed examples, one or more components are mounted on brackets within the enclosure that allow air flow underneath the components. Relatively large components of the power system, such as the compressor, the engine, and/or the generator, are installed on the brackets to secure the components while also providing an air routing path underneath the engine.

In conventional power systems, multiple air flow paths or fans are needed. Additionally, in conventional power systems, an air compressor is cooled by a dedicated fan or by a cooler that is integrated with the engine cooling system, such as a radiator. Disclosed examples achieve thermal alignment of critical temperatures of the power system components along a single air routing path through the power system. That is, the air routing path and the components are arranged in disclosed examples such that the components requiring the coolest temperatures are cooled first and the components permitting the highest temperatures are cooled last, with temperature tolerances of the components increasing along the air routing path. For example, an air compressor cooler has a lowest critical temperature of a set of example components and is located first along the air routing path. A welder, a generator, and electrical power conversion circuitry have next highest critical temperatures and are positioned next along the air routing path after the air compressor cooler. The engine has the next highest critical temperature, followed by the muffler, and are therefore the next components located along the air routing path. Accordingly, in disclosed examples one air routing path is capable of successfully cooling all of the components.

In disclosed examples, an oil cooler of an air compressor is located near (e.g., immediately after) an air inlet to the enclosure. In combination with the flow of the air routing path, the placement of the oil cooler enables the compressor to be cooled by the engine fan even though the compressor cooler is on the opposite end of the power system enclosure. As a result, the compressor and engine can be oriented as appropriate for the compressor to be driven by the engine-generator assembly, while still allowing the engine fan to cool the compressor.

In some examples, a small generator fan is present to specifically cool the generator windings. Like the engine fan, the generator fan moves air from the first compartment to the second compartment to maintain a single air inlet and a single air outlet. The generator fan can be significantly smaller since the generator fan is only cooling the generator.

In conventional power systems, the air compressor is located next to and/or below the engine to enable connection between the compressor shaft and the engine shaft via a belt. In disclosed examples, an air compressor is elevated above the generator centerline to enable the weld components to be located underneath the compressor, which places the weld components in the air flow path as the second cooled component after the compressor cooler. The location of the weld components immediately after the compressor in the air flow path eliminates the need for a dedicated air flow path and/or fan to cool the weld components, and/or allows weld components and/or the compressor to fit in a smaller enclosure size. Disclosed examples also reduce the difficulty of servicing the air compressor, relative to conventional power systems, because the higher location in the enclosure positions the service points closer to top cover openings and/or side door openings that are generally easier to access for maintenance personnel.

In disclosed examples, the air compressor is driven by the end of an armature shaft directly connected to the engine crankshaft, such that the crankshaft and armature shaft are on the same axis and operate as one shaft. In conventional multi-output engine-driven power systems (e.g., power systems that include a generator, compressor, welder, and/or battery chargers) have a generator that is parallel to the engine and driven by a belt. By directly connecting the generator to the engine (e.g., and not connecting the compressor to the engine), disclosed examples reduce the number of moving parts (e.g., only the compressor is belt-driven instead of both the generator and the compressor being belt-driven), which results in greater reliability and a more physically compact system. The direct connection of the generator to the engine places the components with the axis of rotation along the length of the enclosure, which puts the side of the engine and the compressor facing the side of the enclosure that permits easy service access (e.g., the same side of the enclosure). Disclosed examples offset the centerlines of the armature shaft of the generator and the compressor, to enable installation of a belt to connect the generator and the compressor. The offset is achieved in disclosed examples by raising a height of the compressor above the generator.

In conventional power systems, the fuel tank is often external to the enclosure or integral to the engine assembly. The placement of the engine in a second compartment of the enclosure, the placement of the compressor and the welding circuitry in a first compartment of the enclosure, and the placement of the generator in the middle of the enclosure allows the fuel tank to be adjacent to the generator in the central region of the unit. The placement of the components and the fuel tank is an improvement over conventional power systems by including the fuel tank within the enclosure with separation from the engine and by enabling a higher fuel tank capacity within the enclosure (e.g., including the fuel tank in the first compartment, while the engine is in the second compartment). The inclusion of the fuel tank within the enclosure reduces or avoids the need for an installer to include a separate fuel tank and/or from requiring a larger power system footprint. Furthermore, the location of the fuel tank in the first, lower temperature, compartment contributes to keeping fuel temperatures low, which reduces the likelihood of fuel vapor lock.

As used herein, power conversion circuitry refers to circuitry and/or electrical components that convert electrical power from one or more first forms (e.g., power output by a generator) to one or more second forms having any combination of voltage, current, frequency, and/or response characteristics. The power conversion circuitry may include safety circuitry, output selection circuitry, measurement and/or control circuitry, and/or any other circuits to provide appropriate features.

As used herein, the terms "first" and "second" may be used to enumerate different components or elements of the same type, and do not necessarily imply any particular order. For example, while in some examples a first compartment is located prior to a second compartment in an airflow path, the terms "first compartment" and "second compartment" do not imply any specific order in which air flows through the compartments.

Disclosed example power systems have improved airflow and include an enclosure; an air inlet location at a first location on an exterior of the enclosure to permit air intake from the exterior of the enclosure to an interior of the enclosure; an air exhaust location at a second location on the exterior of the enclosure to exhaust the air taken in through the air inlet location; and an air routing path defined by the enclosure to direct air from the air inlet location to the air exhaust location. The air routing path traverses, in order, through one or more first compartments in the enclosure, the one or more first compartments containing at least one of a compressor, a generator, or power conversion circuitry, and through one or more second compartments, the one or more second compartments containing an engine and a muffler.

In some examples, the first location is on a side of the enclosure and the second location is at a top of the enclosure when the power system is installed in a predetermined orientation. In some examples, the power system is configured to provide adequate air flow with zero installation clearance on sides of the enclosure that do not include the air inlet location or the air exhaust location. In some example power systems, the enclosure does not include any other air inlet locations.

In some example power systems, the air routing path routes the air to cool at least one of the compressor, the power conversion circuitry, the generator, the engine, or the muffler. In some examples, the air routing path is further to route the air to an air intake of the engine, the engine to use at least a portion of the air in the air routing path for combustion. In some such examples, the engine is arranged in the enclosure to have the air intake of the engine near a second side of the enclosure that is opposite the side of the enclosure having the air inlet location, where the air routing path routes the air the length of the enclosure from the air inlet location to the air intake of the engine.

In some examples, the air routing path includes a separation barrier between first and second compartments, the fan to urge air from the first one or more compartments to the second one or more compartments. In some examples, the compressor extracts air from the air routing path and pressurize the air, the engine to provide power to the compressor. In some examples, the air routing path directs the air to cool multiple components within the enclosure, the multiple components comprising the engine.

Some example power systems further include an engine fan to pull the air from the air inlet location through the first compartments and to push the air through the engine and to the air exhaust location through the one or more second compartments. In some examples, the enclosure is configured to provide service access to the interior of the enclosure to provide access to serviceable components of the power system from the same side of the enclosure. In some such examples, the serviceable components comprise the compressor and the engine.

In some examples, the air routing path includes a volume underneath an engine mounted in the enclosure that includes the first compartment and is located under the second compartment. In some examples, the air routing path reverses a direction of travel along at least one axis between the one or more first compartments and the one or more second compartments. Some examples further include one or more brackets or braces to support the engine and the generator within the enclosure and to define the air routing path.

Figure 1:
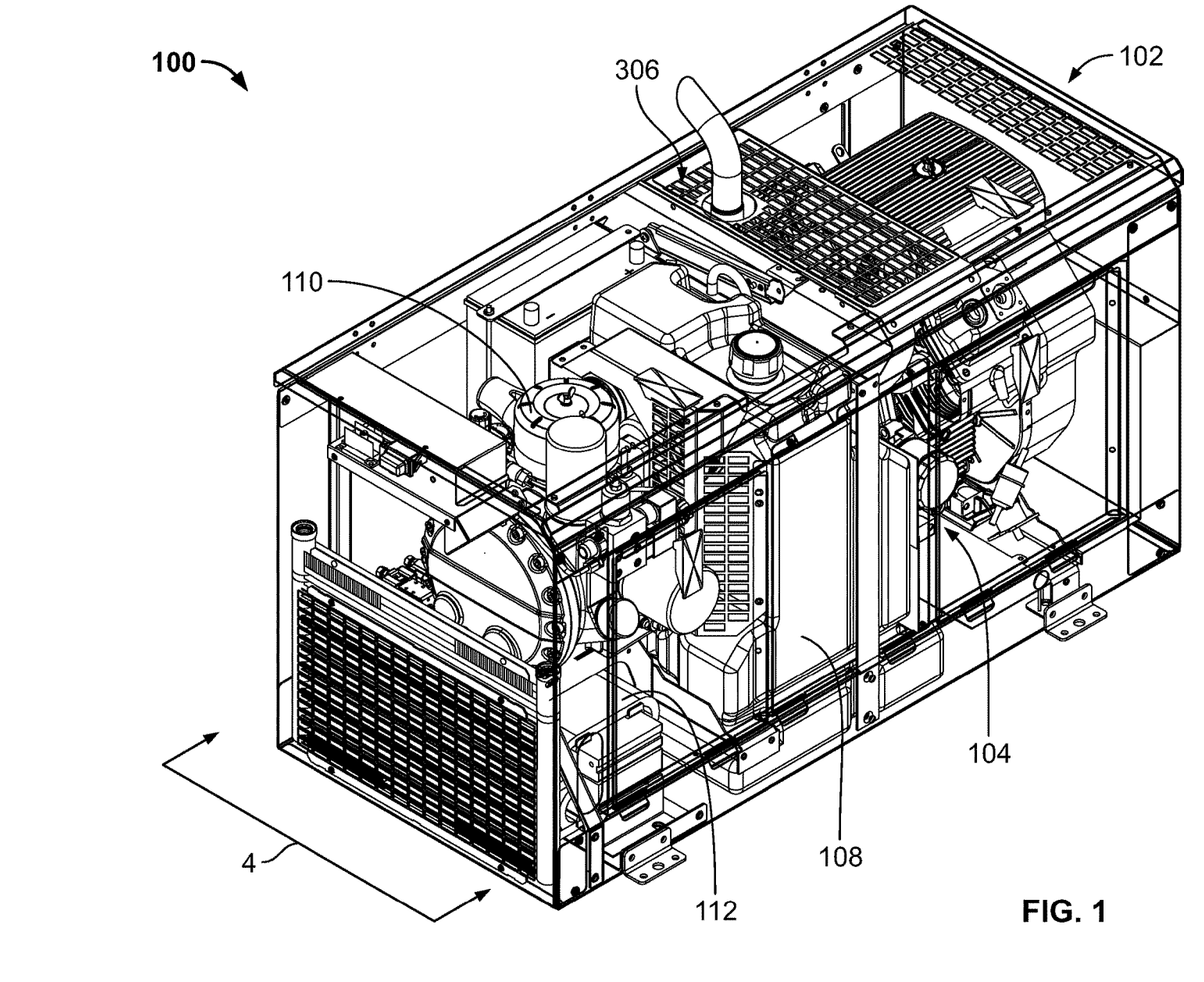
FIG. 1 is a perspective view of an example power system arranged within an enclosure.

FIG. 1 is a perspective view of an example power system 100 arranged within an enclosure 102. The enclosure 102 is primarily constructed with sheet metal, and may include multiple panels. One or more of the panels may be removable and/or one or more of the panels may open to permit access.

The example power system 100 of FIG. 1 is an engine-driven power system. The system 100 includes an engine 104 that drives a generator 106 to generate electrical power. The engine 104 receives fuel from a fuel tank 108. The generator 106 provides the electrical power to an air compressor 110 and/or power conversion circuitry 112. The power conversion circuitry 112 provides one or more types of electrical power suitable for specific and/or general purpose uses, such as welding power, 110 VAC and/or 220 VAC power, battery charging power, and/or any other type of electrical power. The example system 100 may include other components not specifically discussed herein. The components 104-112 are arranged within the enclosure 102 as described herein.

The power system 100, the enclosure 102, and the components 104-112 feature an improved construction and configuration that simplifies the machine design and, as described in detail below, have airflow paths that allow the unit to be placed in, operate in, and be serviced in truck mounted installations.

Figure 2:
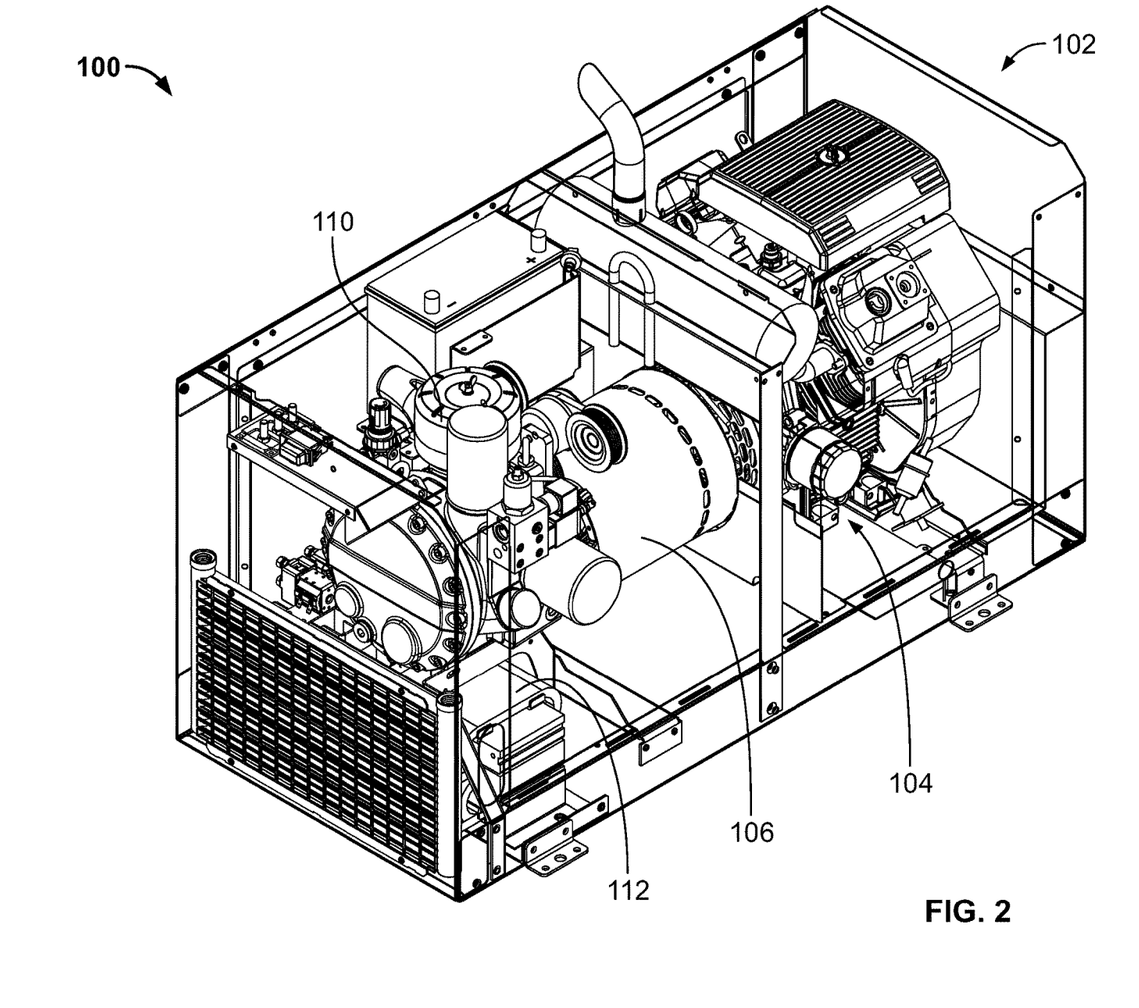
FIG. 2 is another perspective view of the example power system with selected panels of the enclosure removed.

FIG. 2 is another perspective view of the example power system 100 with selected panels of the enclosure 102 and the fuel tank 108 removed. The arrangements of the engine 104, the generator 106, the air compressor 110, and the power conversion circuitry 112 can be more easily seen in FIG. 2.

Figure 3:
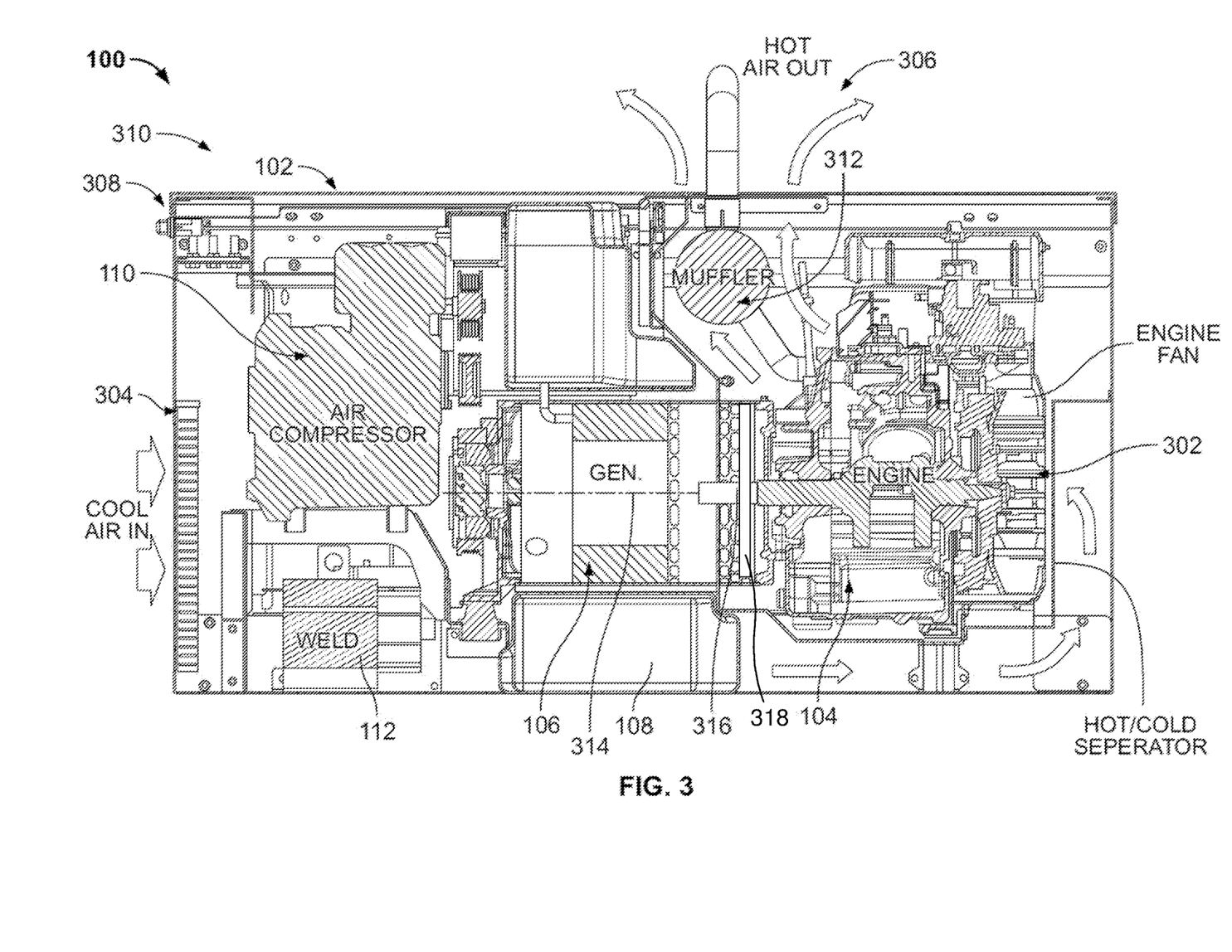
FIG. 3 is a side view of the example power system of FIG. 1.

FIG. 3 is a side view of the example power system 100 of FIG. 1. The example of FIG. 3 illustrates an advantageous air routing path 301 (shown in black arrows through the enclosure 102) that uses an engine fan 302 as the only fan pulling air in through an air inlet location 304 and pushing air out through an air exhaust location 306. The air inlet location 304 is on a first side 308 of the enclosure 102 and the air exhaust location 306 is at a top 308 of the enclosure 102 adjacent a muffler 312.

The enclosure 102 has an improved cooling air flow by having the single air inlet location 304 for all of the cooling air located at one end of the enclosure, and the one air exhaust location 306 for all exiting hot air at the top of the enclosure 102. In some examples, other inlet and/or exhaust locations may be included on the enclosure 102 while maintaining the air routing path 301 as the primary cooling air flow path.

The power system 100 has an improved cooling air flow due to thermal alignment of the components 104-112 in the enclosure 102. As shown in FIG. 3, the one air routing path 301 can cool multiple systems and components. The example air routing path travels through and/or around, in order, a front compressor/welder compartment in the enclosure 102, underneath the engine 104 mounted in the enclosure 102, through and/or around the engine 104, and then past the muffler 312 out the top of the enclosure 102. The example air flow configuration allows the system 100 to be installed into truck and/or other tight applications with zero clearance on more than one side. Because there are no access or airflow inlets or exits present (and/or negligible inlets and/or outlets present) on multiple sides of disclosed example enclosures, and only one side has an airflow intake, the zero clearance can be achieved on the other sides.

As illustrated in FIG. 3, the air compressor 110 is elevated above centerline 314 (e.g., the armature) of the generator 106. By elevating the compressor 110, the power conversion circuitry 112 (e.g., weld components) can be located underneath the compressor 110 in the air routing path as the second cooled component after the compressor 110. The placement of the power conversion circuitry 112 immediately after the compressor 110 in the air routing path 301 reduces or eliminates the need for a dedicated air flow path and/or fan to cool the power conversion circuitry 112 and/or allows power conversion circuitry 112 and/or the compressor 110 to fit in a smaller enclosure 102.

The air compressor 110 is driven by the end of an armature shaft (e.g., the centerline 314) directly connected to a crankshaft 316 of the engine 104, such that the crankshaft 316 and the armature shaft are on the same axis and operate as one shaft. By directly connecting the generator 106 to the engine 104 (e.g., and not connecting the compressor 110 to the engine 104), the example power system 100 has a reduced number of moving parts because only the compressor 110 is belt-driven, instead of both the generator 106 and the compressor 110 being belt-driven. Reducing the number of moving parts results in greater reliability and a more physically compact system.

The placement of the compressor 110 above the generator 106 also reduces the difficulty of servicing the compressor 110, relative to conventional power systems, because the higher location in the enclosure positions the service points closer to top cover openings and/or side door openings that are generally easier to access for maintenance personnel.

Figure 4:
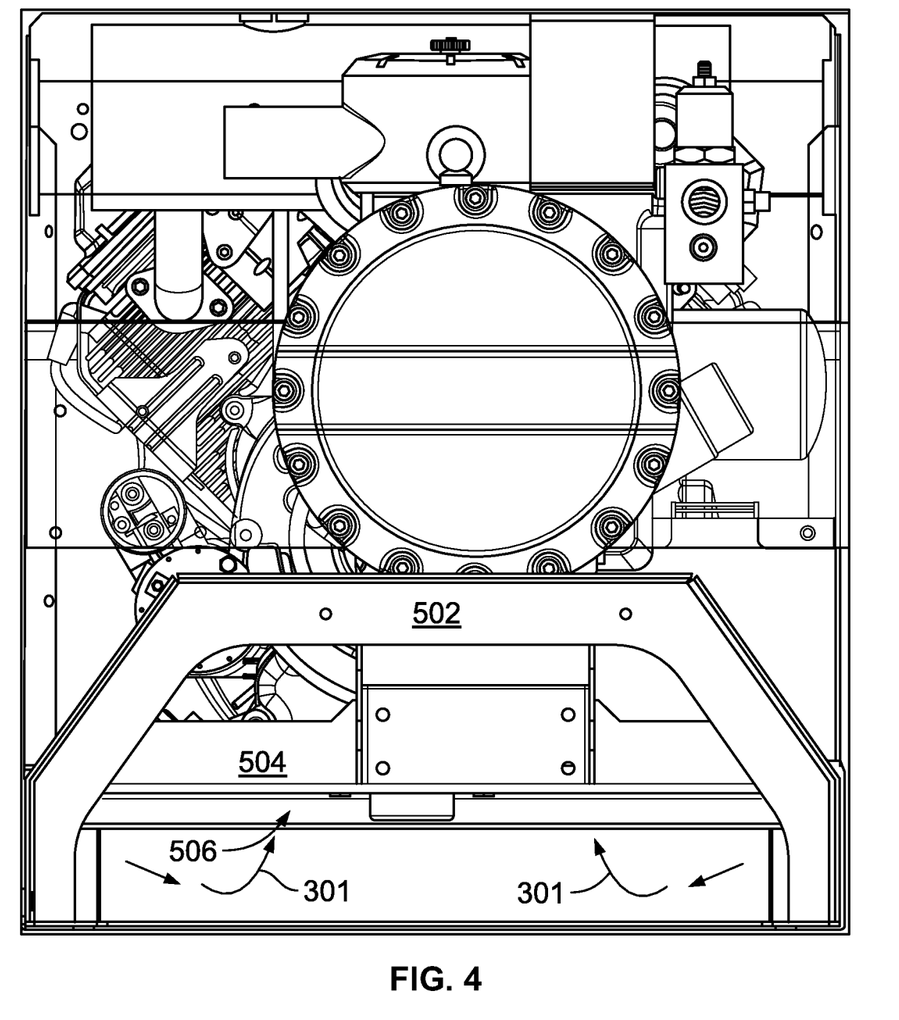
FIG. 4 is a side view of the example power system of FIG. 1, viewed from a side including the air intake location.

FIG. 4 is a side view of the example power system 100 of FIG. 1, viewed from a side including the air inlet location 304. In the perspective shown in FIG. 4, the air routing path 301 flows into the page and the, upon reaching an end of the enclosure, upward to the engine fan 302.

Figure 5:
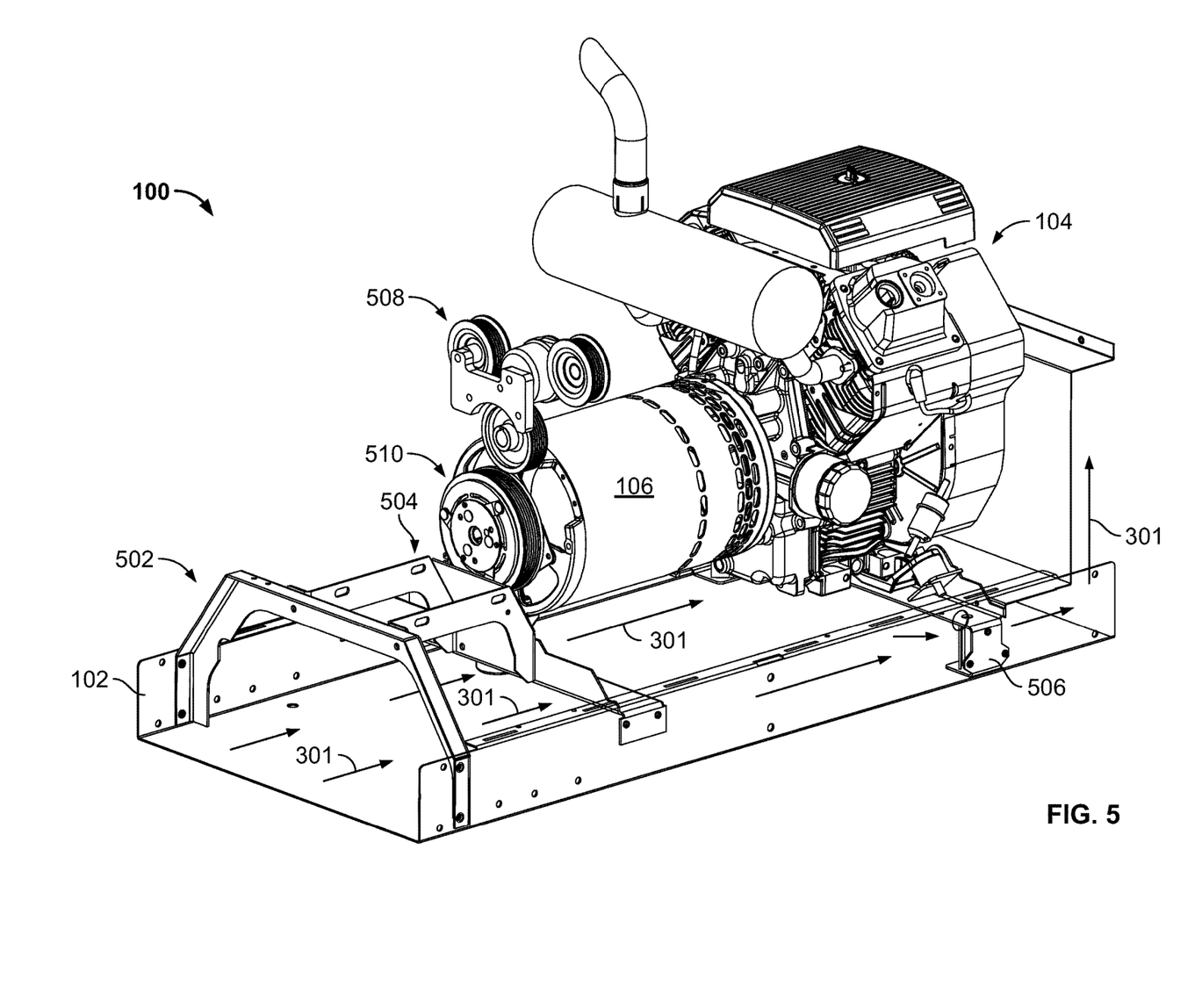
FIG. 5 is a perspective view of selected components of the power system of FIG. 1, showing brackets in a base and showing a compressor drive from a shaft of a generator.

FIG. 5 is a perspective view of selected components of the power system of FIG. 1, showing brackets 502, 504, 506 in a base and showing a compressor drive 508 from a shaft 510 of a generator 106. As shown in FIG. 5, the compressor drive 508 is offset for the generator shaft 510 of the generator 106. FIG. 5 also illustrates the air routing path 301 shown in FIG. 3 flowing beneath the brackets 502, 504, 506 from the air inlet location 304 and underneath the engine 104 to an opposite side of the enclosure 102 from the air inlet location 304.

Figure 6:
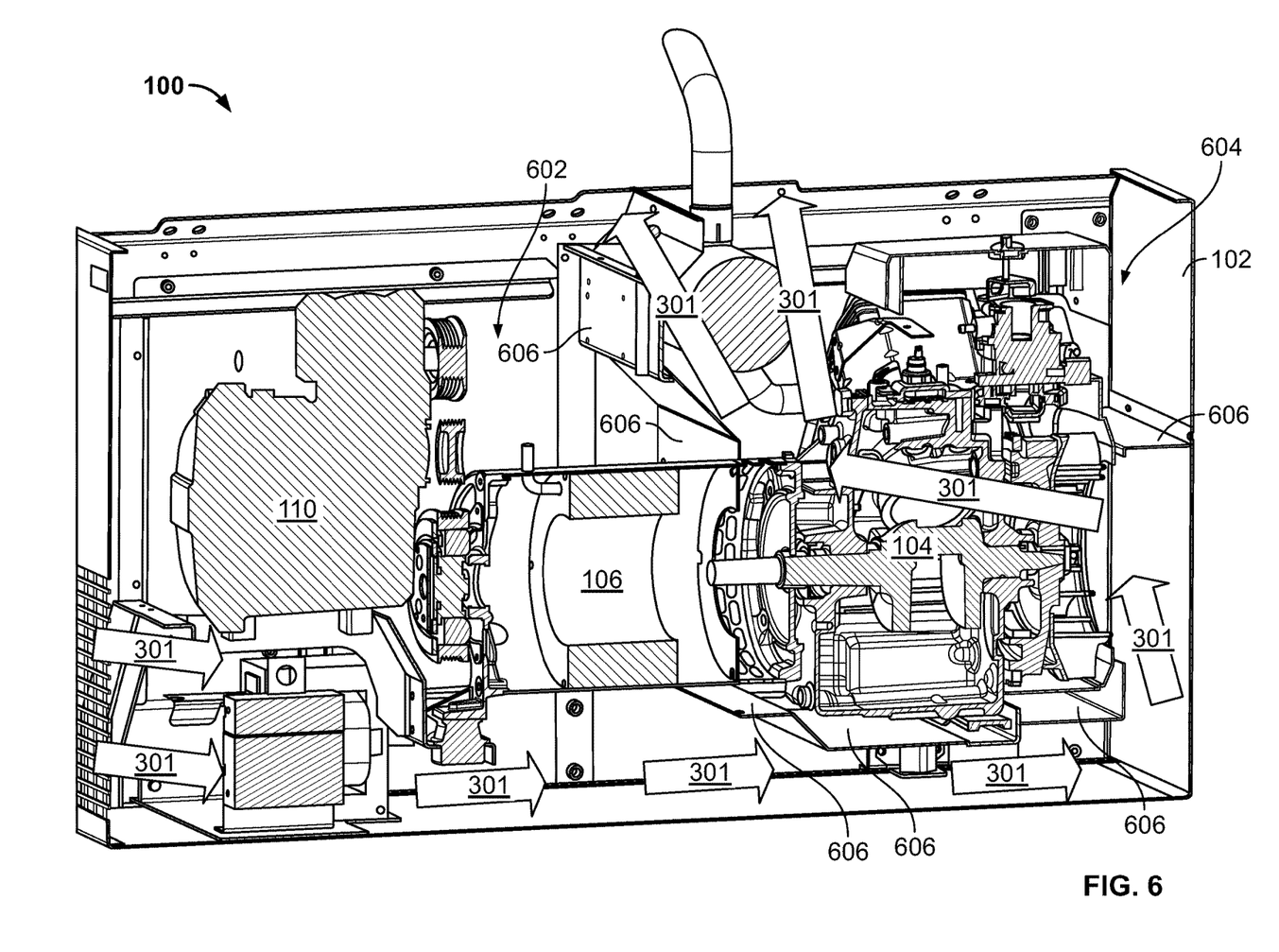
FIG. 6 is another perspective view of selected components of the power system shown in FIG. 5.

FIG. 6 is another perspective view of selected components of the power system 100 shown in FIG. 5. FIG. 6 also illustrates the example air routing path 301 through the enclosure 102. As shown in FIGS. 3 and 6, the enclosure 102 is divided into one or more first compartments 602 and one or more second compartments 604. The first compartment(s) 602 include the air compressor 110, the power conversion circuitry 112, and the generator 106. The second compartment(s) 604 include the engine 104 and the muffler 312.

The air routing path 301 directs the air entering through the air inlet location 304, then to the air compressor 110 (e.g., around an oil cooler of the air compressor 11), then the power conversion circuitry 112 (e.g., welding/battery charging components), then around the generator 106, around the engine 104, and then the muffler 312. The air then exits the enclosure 102 through the top cover above the engine 104 and the muffler 312 via the air exhaust location 306. The thermal alignment of the illustrated example places the lower critical temperature cooling components (the air compressor 110 cooler and the power conversion circuitry 112), which need the coolest air to operate, first in the air routing path 301. The thermal alignment then places the engine 104 and/or the generator 112, which can be cooled with preheated air that cooled the previous components. Finally, the thermal alignment places the muffler 312, which operates very hot and can cool with hot air, after the engine 104 and/or the generator 106.

The air routing path 301 reverses a direction of travel after traveling through the first compartment(s) 602 and below the engine 104 to the engine fan 302 to the second compartment(s) 604. A separation barrier 606 reduces or prevents cooler air in the first compartment(s) 602 from mixing with hotter air in the second compartment(s) 604. The separation barrier 606 causes a large portion of the air to go through the engine fan 302 to travel from the first compartment(s) 602 to the second compartment(s) 604.

While the engine fan 302 is the primary driver of the air through the air routing path 301 (e.g., via suction through the first compartment(s) 602 and pressure in the second compartment(s) 604), in some examples, the generator 106 includes a small generator fan 318 to specifically cool the generator windings Like the engine fan 302, the generator fan 318 moves air from the first compartment(s) 602 to the second compartment(s) 604 to maintain a single air inlet and a single air outlet. The generator fan 318 can be significantly smaller than the engine fan 302 and is not the primary driver of the air flow, because the generator fan 318 only cools the generator 106. Additionally, the generator fan 318 does not bypass the separation barrier 606 or permit the hot air from the second compartment(s) 604 to mix into the cool air in the first compartment(s) 602.

Figure 7:
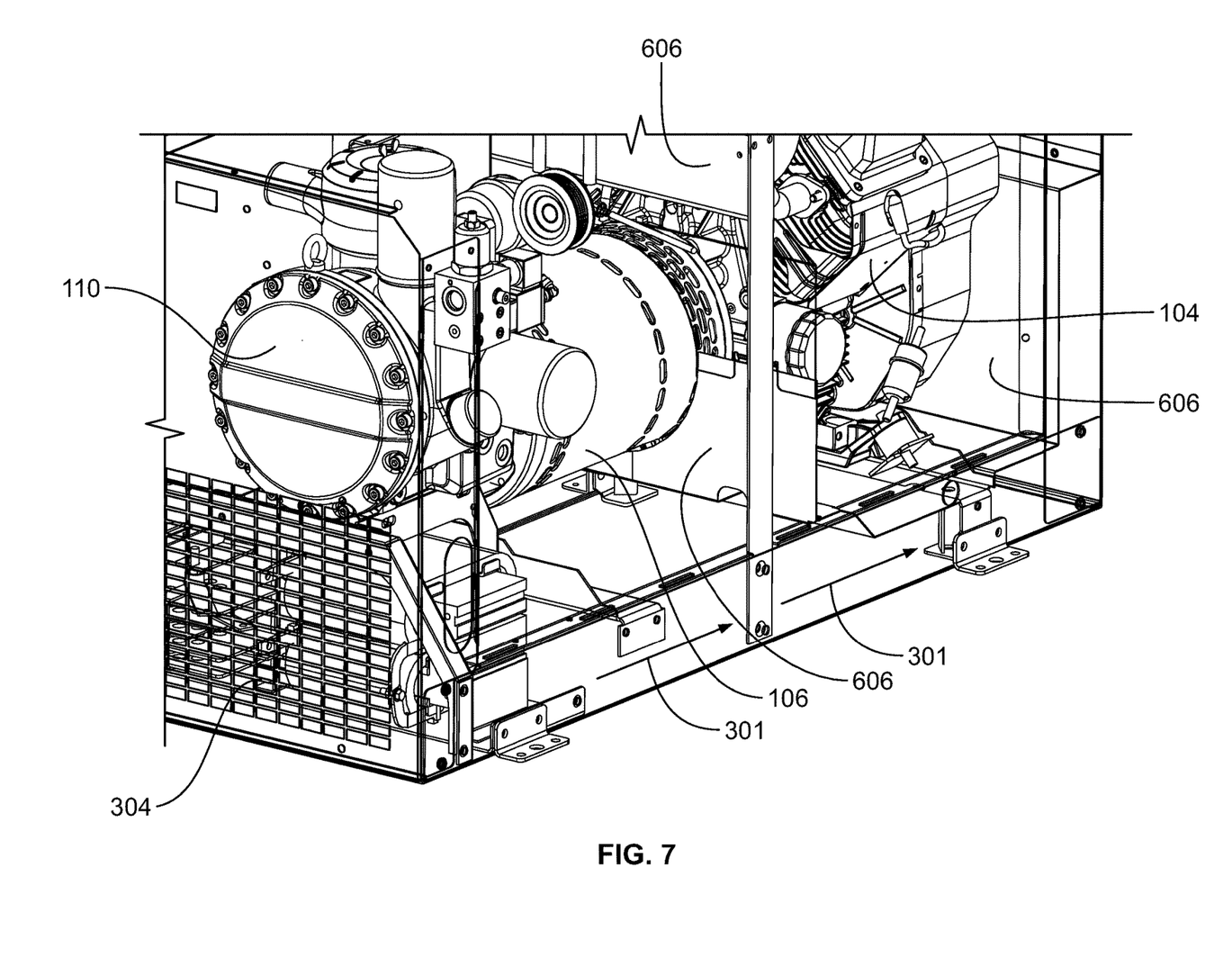
FIGS. 7 and 8 are perspective views of selected components of the power system of FIG. 1, showing brackets in the base that support the components and provide an air routing path from the air intake location to the engine fan.
Figure 8:
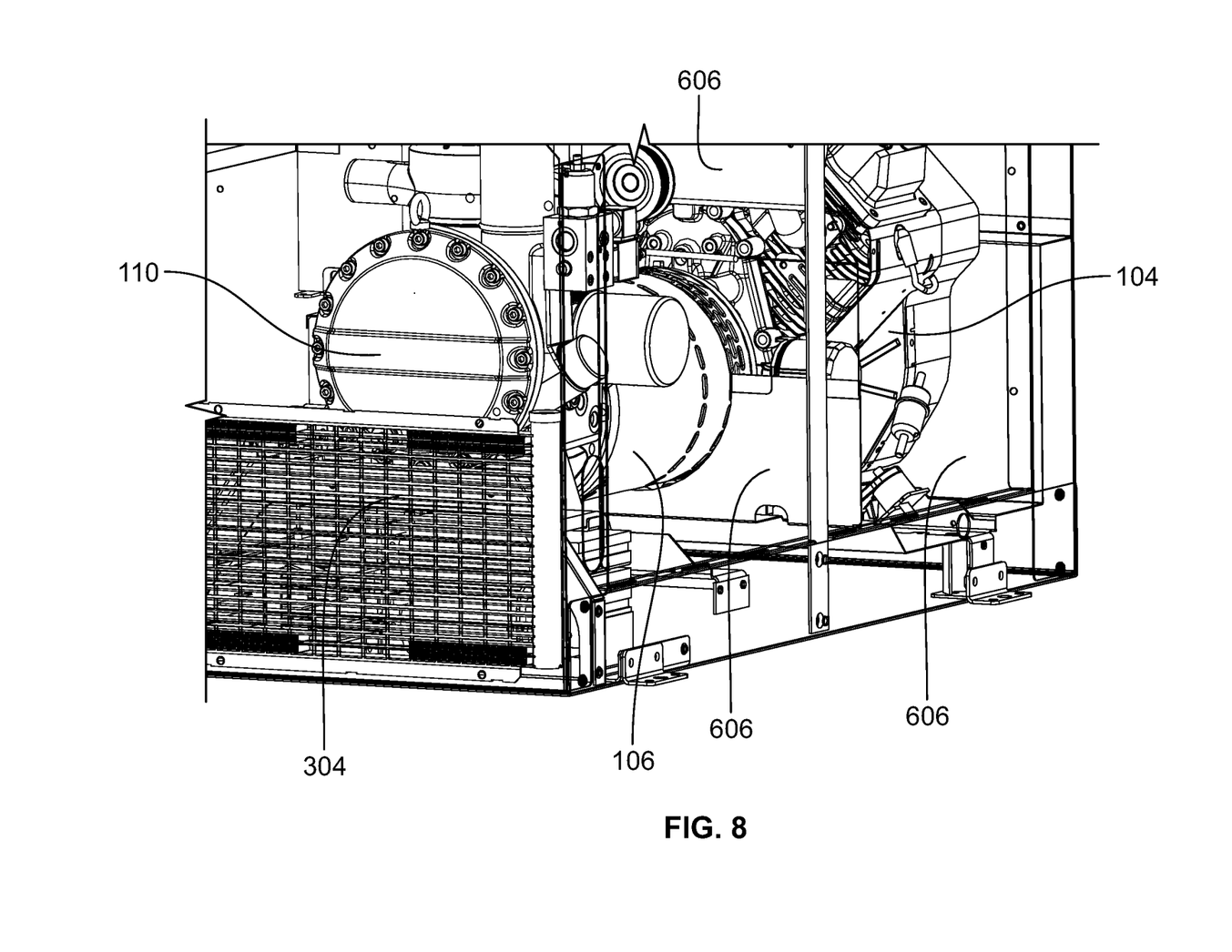

FIGS. 7 and 8 show additional views of selected components of the power system 100 of FIG. 1, including the brackets 502, 504, 506 in the base that support the components 104-112 and define portions of the air routing path 301 from the air inlet location 304 to the engine fan 302.

Figure 9:
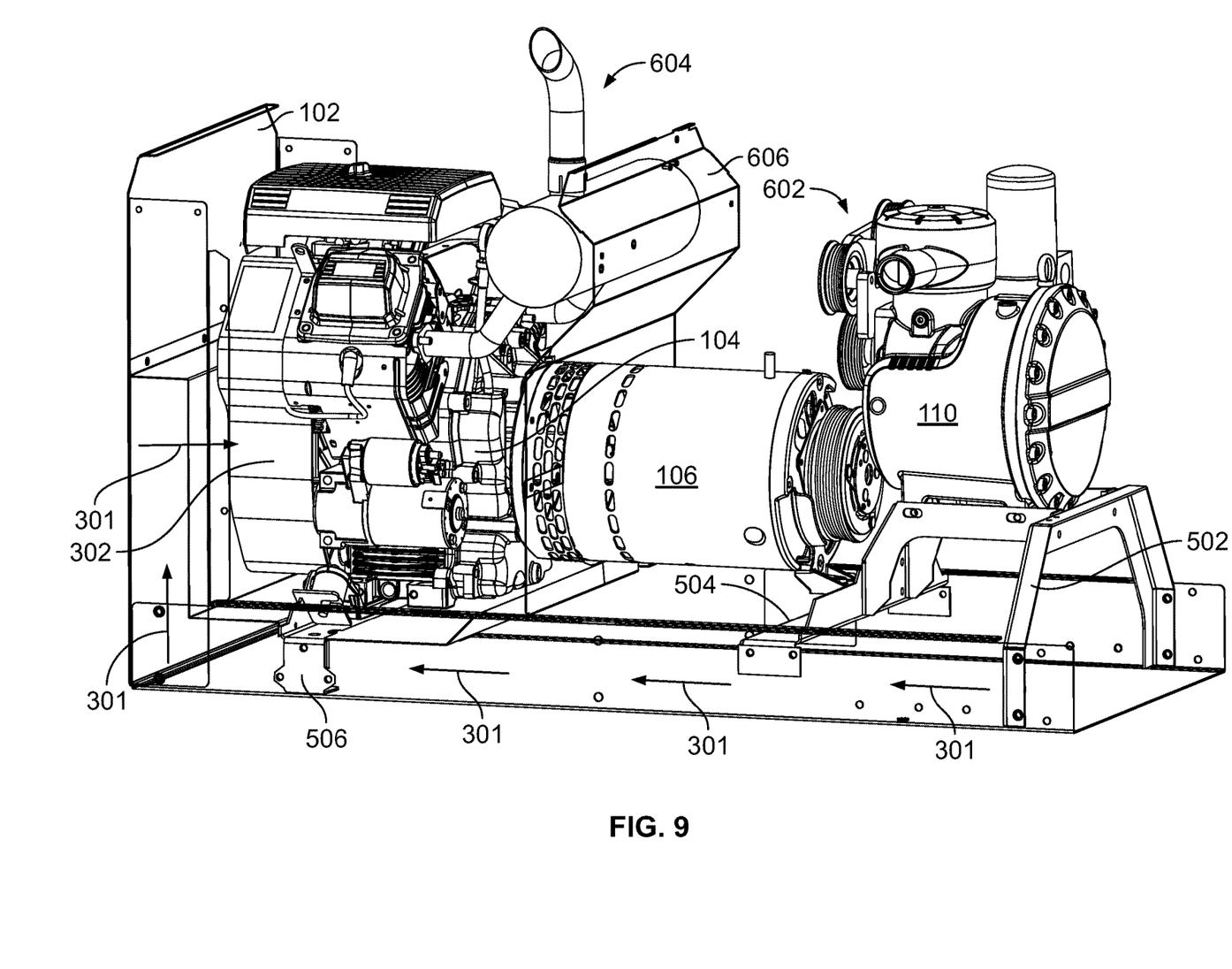
FIG. 9 is another perspective view of selected components of the power system of FIG. 1, showing brackets in the base that support the components and provide an air routing path from the air intake location to the engine fan.

FIG. 9 is another perspective view of selected components of the power system 100 of FIG. 1, showing the brackets 502, 504, 506 in the base that support the components 104-112 and provide the air routing path 301 from the air inlet location 304 to the engine fan 302.

Figure 10:
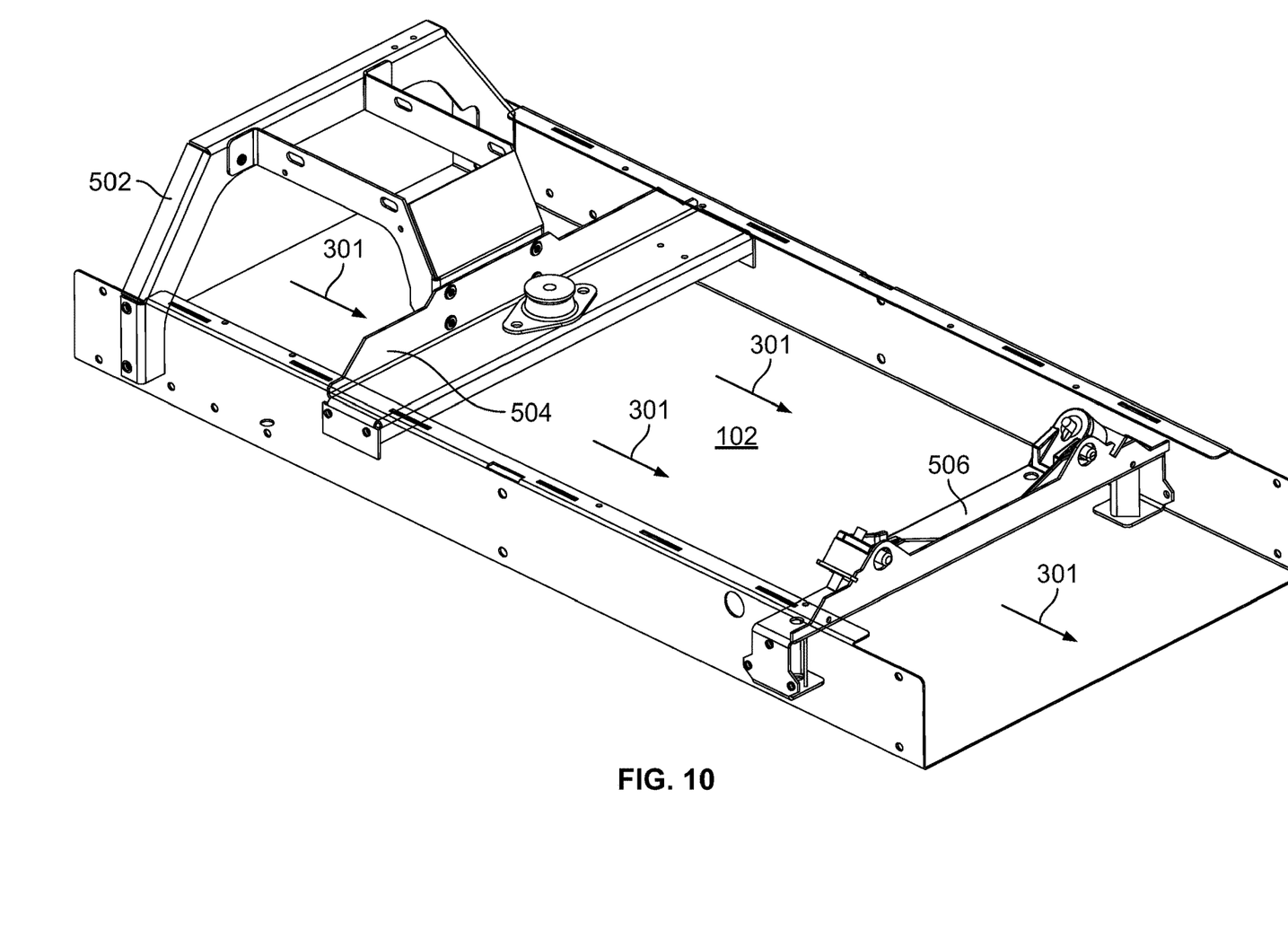
FIG. 10 is a cutaway perspective view of selected components of the power system of FIG. 1, showing an air routing path and support brackets for a compressor, a generator, and an engine.

FIG. 10 is a cutaway perspective view of selected components of the power system 100 of FIG. 1, showing an air routing path 301 and the support brackets 502, 504, 506 for the compressor 110, the generator 106, and the engine 104. As shown in FIG. 10, the brackets 502, 504, 506 are used to bridge the bottom of the enclosure 102 to create an open channel for air flow.

Figure 11:
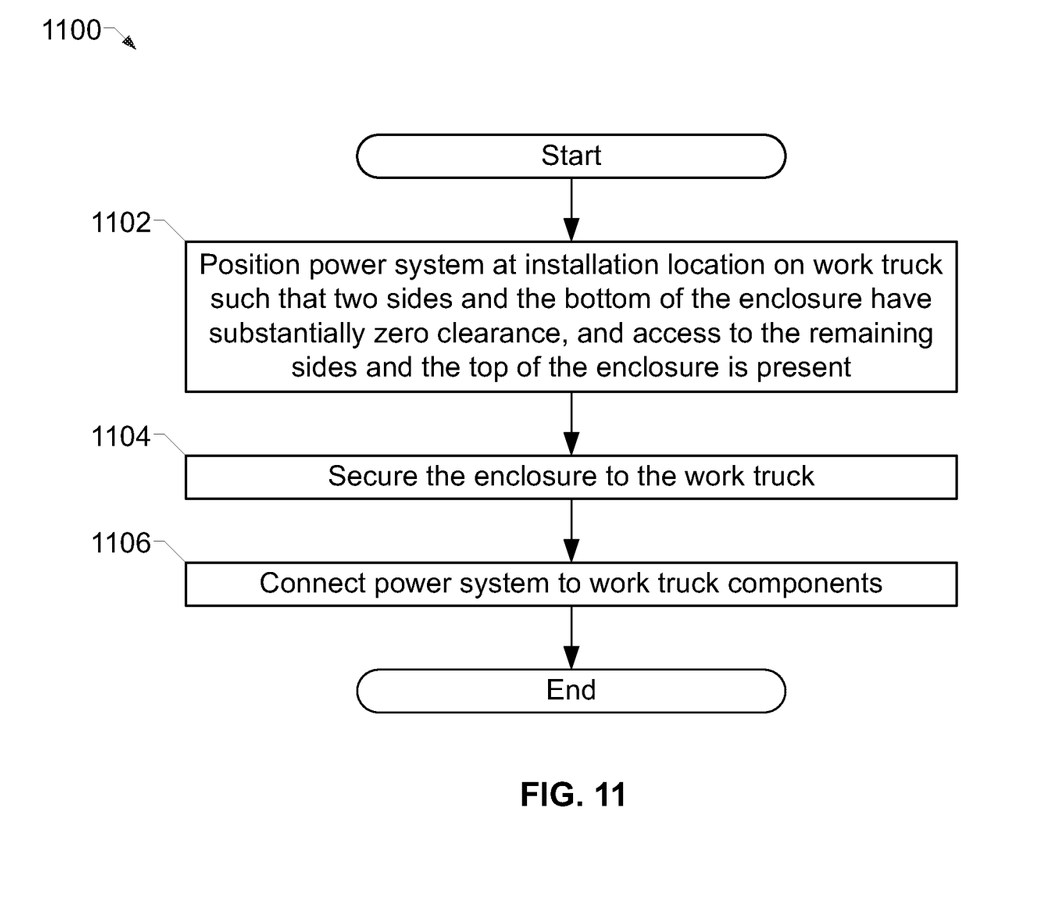
FIG. 11 is a flowchart representative of an example method to install the example power system of FIGS. 1-10.

FIG. 11 is a flowchart representative of an example method 1100 to install the example power system 100 of FIGS. 1-10. For example, the method 1100 may be performed to install the power system 100 on a work truck in a manner that provides zero clearance between the power system 100 and adjacent surfaces for up to three faces of the enclosure 102 that do not provide service access and/or air flow (e.g., two sides and the bottom), while also providing service access and clearance to provide sufficient airflow to the power system 100. While the example method 1100 is described with reference to the power system 100, the method 1100 may be used with other power systems having the same or similar air flow and/or service access features.

At block 1102, the power system 100 is positioned at an installation location on a work truck in which up to two sides and the bottom of the enclosure 102 have substantially zero clearance, and access to the remaining sides and the top of the enclosure is present. For example, two sides and the bottom of the enclosure 102 may be positioned with substantially zero clearance to surfaces of a work truck. Provided the face with the air inlet location 304 (e.g., a first side of the enclosure 102), the face with the air exhaust location 306 (e.g., the top of the enclosure 102), and the face to provide service access to the engine 104 and the air compressor 110 (e.g., a second side of the enclosure 102) are available, the example power system 100 has sufficient cooling with zero clearance on the remaining faces of the enclosure 102.

At block 1104, the enclosure 102 is secured to the work truck in the position achieved in block 1102. For example, the enclosure 102 may be secured with bolts, rivets, and/or any other type of fastener or securing mechanism to prevent movement of the power system 100 within the work truck.

At block 1106, the power system 100 is connected to work truck components. For example, the power system 100 may be connected to output different types of power to systems provided on the work truck, such as electric systems, truck systems (e.g., the truck batteries), a control and/or output panel connected to the truck at a location separate from the power system 100, pneumatic systems, hydraulic systems, and/or any other type of system that may be powered by the power system 100. The example method 1100 then ends.

Disclosed examples place components and include an enclosure enables installation of a power system tightly against adjacent walls (e.g., zero clearance) on more than one side. Additionally or alternatively, disclosed examples permit service access for the compressor and engine through one side of the unit and through the top of the unit (as may be desirable in a truck mounted installation). Disclosed examples provide an airflow path within the enclosure that is novel, achieves standard mounting of the generator to the engine, and drives the compressor from the generator shaft while maintaining one primary airflow cooling path through the enclosure.

The thermal alignment of the airflow circuit allows the engine fan to cool more than just the engine. Specifically, the air compressor cooler is cooled by air pulled into the engine by the engine fan. The use of the engine fan to move the air enables the use of only one inlet location and one outlet location, which is beneficial for truck mounted installations. The use of the engine fan improves the efficiency of use of the cooling air and/or reduces the number and/or size of cooling fans.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, the present method and/or system are not limited to the particular implementations disclosed.

What is claimed is:

1. A power system having improved airflow, the power system comprising:
    an enclosure;
    an air inlet location at a first location on an exterior of the enclosure to permit intake of air from the exterior of the enclosure to an interior of the enclosure;
    an air exhaust location at a second location on the exterior of the enclosure to exhaust the air taken in through the air inlet location; and
    an air routing path defined by the enclosure to direct the air from the air inlet location to the air exhaust location, in order:
        through one or more first compartments in the enclosure, the one or more first compartments containing a generator; and
        through one or more second compartments, the one or more second compartments comprising an engine and a muffler; and
    a fan configured to urge the air to create a higher pressure in the one or more second compartments than in the one or more first compartments.

2. The power system as defined in claim 1, wherein the first location is on a side of the enclosure and the second location is at a top of the enclosure when the power system is installed in a predetermined orientation.

3. The power system as defined in claim 1, wherein the power system is configured to provide adequate air flow with zero installation clearance on sides of the enclosure that do not include the air inlet location or the air exhaust location.

4. The power system as defined in claim 1, wherein the air routing path is to route the air to cool at least one of a compressor, power conversion circuitry, the generator, the engine, or the muffler.

5. The power system as defined in claim 1, wherein the air routing path is further to route the air to an air intake of the engine, the engine to use at least a portion of the air in the air routing path for combustion.

6. The power system as defined in claim 5, wherein the engine is arranged in the enclosure to have the air intake of the engine near a second side of the enclosure that is opposite the side of the enclosure having the air inlet location.

7. The power system as defined in claim 6, wherein the air routing path is configured to route the air the length of the enclosure from the air inlet location to the air intake of the engine.

8. The power system as defined in claim 1, wherein the enclosure comprises:
    a separation barrier between the one or more first compartments and the one or more second compartments, wherein the fan is configured to urge air from the one or more first compartments to the one or more second compartments around the separation barrier.

9. The power system as defined in claim 1, wherein the one or more first compartments further contain a compressor configured to extract air from the air routing path and to pressurize the air, the engine configured to provide power to the compressor.

10. The power system as defined in claim 1, wherein the air routing path is configured to direct the air to cool multiple components within the enclosure, the multiple components comprising the engine.

11. The power system as defined in claim 1, wherein the fan is an engine fan configured to pull the air from the air inlet location through the one or more first compartments and to push the air through the engine and to the air exhaust location through the one or more second compartments.

12. The power system as defined in claim 1, wherein the enclosure is configured to provide service access to the interior of the enclosure to provide access to serviceable components of the power system from one side of the enclosure.

13. The power system as defined in claim 12, wherein the serviceable components comprise a compressor and the engine.

14. The power system as defined in claim 1, wherein the air routing path includes a volume underneath the engine mounted in the enclosure.

15. The power system as defined in claim 14, wherein a second portion of the volume directs air from the one or more first compartments to the one or more second compartments in the air routing path.

16. The power system as defined in claim 1, wherein the one or more first compartments further contain a compressor elevated above a centerline of the generator, and power conversion circuitry located underneath the compressor.

17. The power system as defined in claim 1, wherein the air routing path travels through or around, in order:
- the one or more first compartments in the enclosure including a compressor, power conversion circuitry, and the generator;
- underneath the engine;
- at least one of through or around the engine;
- past the muffler; and
- out the top of the enclosure.

18. The power system as defined in claim 1, wherein the generator is configured to pass at least a portion of the air from the one or more first compartments to the one or more second compartments through the generator to cool the generator.

19. The power system as defined in claim 1, further comprising one or more brackets or braces to support the engine and the generator within the enclosure and to define at least a portion of the air routing path.

* * * * *